United States Patent [19]

Johnson et al.

[11] Patent Number: 4,997,668

[45] Date of Patent: Mar. 5, 1991

[54] PRODUCTION OF LOW-CHOLESTEROL MILK FAT BY SOLVENT EXTRACTION

[75] Inventors: Bobby R. Johnson, Cherry Hill; Joseph A. Conte, Jr., Waterford, both of N.J.

[73] Assignee: Campbell Soup Company, Camden, N.J.

[21] Appl. No.: 346,576

[22] Filed: May 2, 1989

[51] Int. Cl.$^5$ .......................... A23C 7/04; A23L 1/29
[52] U.S. Cl. .................................. 426/580; 426/429; 426/586
[58] Field of Search ............... 426/422, 424, 425, 428, 426/429, 431, 586, 580; 260/397.5, 491, 613

[56] References Cited

U.S. PATENT DOCUMENTS

| | | | |
|---|---|---|---|
| 1,805,751 | 5/1931 | Auerbach | 208/321 |
| 2,073,327 | 3/1937 | Vigers | 202/205 |
| 2,165,378 | 7/1939 | Hickman | 203/60 |
| 2,246,894 | 2/1939 | Hickman | 203/60 |
| 2,247,496 | 7/1941 | Hixson | 260/419 |
| 2,351,832 | 6/1944 | Neal | 260/409 |
| 2,407,616 | 9/1946 | Phelps | 426/488 |
| 2,467,906 | 4/1949 | Passino | 260/428.5 |
| 2,613,215 | 10/1952 | Mattil | 260/409 |
| 2,621,197 | 12/1952 | Thurman | 260/428 |
| 2,674,609 | 4/1954 | Beal | 260/428 |
| 2,759,883 | 8/1956 | Thurman | 203/72 |
| 3,450,541 | 6/1969 | Schwartz et al. | 426/586 |
| 3,519,435 | 7/1970 | MacCollom | 426/586 |
| 3,563,765 | 2/1971 | Melnick | 426/614 |
| 3,693,322 | 9/1972 | Lineberry | 261/124 |
| 3,717,474 | 2/1973 | Fioriti | 426/614 |
| 3,881,034 | 4/1975 | Levin | 426/424 |
| 3,939,281 | 2/1976 | Schwengers | 426/424 |
| 4,002,772 | 1/1977 | Haas | 426/425 |
| 4,005,228 | 1/1977 | Norris | 426/449 |
| 4,104,286 | 8/1978 | Fallis et al. | 260/397.5 |
| 4,234,619 | 11/1980 | Yano | 426/614 |
| 4,280,961 | 7/1981 | Schneider | 260/412.8 |
| 4,333,959 | 6/1982 | Bracco | 426/614 |
| 4,394,221 | 7/1983 | Stage | 203/92 |
| 4,400,398 | 8/1983 | Coenen | 426/429 |
| 4,504,503 | 3/1985 | Biernoth | 260/428.5 |
| 4,789,554 | 12/1988 | Scavone | 426/601 |
| 4,804,555 | 2/1989 | Marschner | 426/601 |
| 4,838,095 | 6/1989 | Merk | 202/205 |

FOREIGN PATENT DOCUMENTS

| | | |
|---|---|---|
| 0174848 | 3/1986 | European Pat. Off. . |
| 1525315 | 9/1978 | United Kingdom . |
| 1559064 | 1/1980 | United Kingdom . |
| 2109095 | 11/1987 | United Kingdom ................ 260/428 |

OTHER PUBLICATIONS

Dapper, "Use of Polar Aprotic Solvents to Release Membranes from Milk Lipid Globules," J. Dairy Sci., 70:760–765 (1987).
Rizvi, "Supercritical Fluid Extraction: Operating Principles and Food Applications," Food Technology, pp. 57–64.
Rizvi, "Supercritical Fluid Extraction: Fundamental Principles and Modeling Methods," Food Technology, pp. 55–65.
"Molecular Distillation," Perry, Chemical Engineers' Handbook, Ch. 17, pp. 29–33 (4th Ed.).
Dudrow, "Deodorization of Edible Oil," J. Am. Oil Chemists' Soc. 60:224–226 (1963).
"Deodorization," Bailey's Industrial Oil and Fat Products, Chapter 18.
Zehnder, "Deodorization, Principles and Practices," J. Am. Oil Chemists' Soc. 44:478 A et. seq. (1967).
Riisom, "High Performance Liquid Chromatography Analyses of Emulsifiers: I. Quantitative Determinations of Mono- and Diacylglycerols of Saturated Fatty Acids," J. Am. Oil Chemists' Soc. 50:650–652 (1978).
"Methods and Procedures," Bailey's Industrial Oil and Fat Products, 510–513, 4th Ed.
Jurriens, "Analysis of Glycerides: II. Analysis and Characterization of Oils, Fats and Fat Products," p. 222 et seq. (1968).
Keenan, "Biochemical and Morphological Comparison of Plasma Membrane and Milk Fat Globule Membrane from Bovine Mammary Gland," J. Cell Biol. 44:80–93 (1970).
Parsons, "Two-Dimensional Thin-Layer Chromatography of Polar Lipids from Milk and Mammary Tissue," J. Lipid Res. 8:696–698 (1967).
Fillerup, "Chromatographic Separation of the Plasma Lipids," Proc. Soc. Exptl. Biol. Med., 83:574–577 (1953).
Dapper, "Use of Polar Aprotic Solvents to Release Membranes from Milk Lipid Globules," J. Dairy Sci. 70:760–765 (1987).
"Physical Equilibria in Milk: The Lipid Phase," Fundamentals of Dairy Chemistry, pp. 414, 440–447, 475–477.
Shishikura, "Modification of Butter Oil by Extraction with Supercritical Carbon Dioxide," Agric. Biol. Chem. 50:1209–1215 (1986).
Arul, "Distribution of Cholesterol in Milk Fat Fractions," J. Dairy Res. 55:361–371 (1988).
Arul, "Fractionation of Anhydrous Milk Fat by Short-Path Distillation," J. Am. Oil Chemists' Soc. 65:1642–1646 (1988).

Primary Examiner—Donald E. Czaja
Assistant Examiner—Helen Pratt
Attorney, Agent, or Firm—Banner, Birch, McKie & Beckett

[57] ABSTRACT

A process for the production of low-cholesterol milk fat wherein the milk fat is separated into at least one aqueous fraction and a cream fraction. The cream fraction is washed and reseparated a plurality of times to provide a washed cream fraction containing substantially undisturbed milk fat globules and substantially intact milk fat globule membranes. Cholesterol is preferentially extracted from the milk fat globule membranes with an organic polar solvent and without substantial loss of the solid milk fat. Solvent-free, low-cholesterol product is recovered from the reseparated, washed cream fraction. This low-cholesterol milk fat product has composition and organoleptic characteristics substantially similar to those of natural milk fat. The invention also relates to a low-cholesterol milk fat product having composition and organoleptic characteristics substantially similar to those of natural milk fat and produced by the method of this invention.

17 Claims, No Drawings

PRODUCTION OF LOW-CHOLESTEROL MILK FAT BY SOLVENT EXTRACTION

BACKGROUND OF THE INVENTION

1. Field of the Invention

The subject invention relates to a process for the production of low-cholesterol milk fat by solvent extraction. The invention also relates to low-cholesterol milk fat product produced by the process of the invention.

2. Description of Related Art

Milk fat-containing foods are popular with consumers. Consumers prize the distinctive organoleptic properties of milk fat. For example, butter, which is an emulsion of milk fat and water, is highly prized for its properties as a condiment. However, milk fat contains the sterol cholesterol. Recently, cholesterol has been identified as being potentially deleterious to human health when ingested in excessive quantities. Some consumers have therefore become hesitant about utilizing cholesterol-containing products.

Others have recognized the desirability of reducing the cholesterol content of animal fats, including milk fat. However, these methods have proven to be less than satisfactory because the organoleptic properties of the product typically differ significantly from the properties of the natural product. For example, mouth feel, melting point, or color may be significantly altered by the cholesterol removal technique.

A satisfactory cholesterol removal process preferably would maximize removal of cholesterol while minimizing alterations to the properties of the cholesterol-containing product to yield a low-cholesterol product indistinguishable from fresh, natural product. However, known cholesterol-removing processes typically make significant changes in products or organoleptic characteristics.

Fractionation of fats has been used to obtain separate component portions, typically so that the portions can be selectively recombined to yield a product having pre-selected characteristics. For example, the solvent-assisted fractionation disclosed in U.S. Pat. No. 4,005,228 is utilized to separate butter fat into fractions by melting point, i.e. melting point less than 0° C., between 0° and 20° C., and above 20° C. The high- and low-melting fractions are combined to yield a dairy spread.

Supercritical extraction has also been utilized to modify various foodstuffs, including butter, as described in U.S. Pat. No. 4,504,503. However, one of the drawbacks to this technique is that conditions which maintain the solvent in the supercritical region typically involve extremes of temperature and pressure. Therefore, the equipment required is expensive. For example, in this patent, the preferred temperature range is from 40° to 250° C., while the preferred pressure range is from 100 to 400 bar.

British patent specification No. 1,559,064, an improvement of GB No. 1,525,315, discloses the use of molecular distillation to reduce the cholesterol content of a medium containing fats. After degassing, anhydrous fat is subjected to molecular distillation at a pressure less than 0.005 Torr to remove the unsaponifiable fraction, which contains the sterols. Then, in accordance with the method of GB No. 1,525,315, an aqueous medium having a viscosity of from 2000 to 20,000 cp measured at a temperature between 20° and 30° C. is mixed into the treated fat at a temperature between 15° and 45° C.

Both U.S. Pat. No. 2,613,215 and EP No. 0 174 848 A2 teach that cholesterol can be removed from fats by contacting the fat with a solid absorbent or adsorbent material. Silica gel and activated carbon are utilized as examples of appropriate material.

The above-described methods for cholesterol removal are unsatisfactory. Previously, those wishing to remove cholesterol from milk fat typically started with butter. However, churning distributes the cholesterol within the fat, thus diluting it. In contrast, in an undisturbed milk fat globule, free cholesterol, which comprises about 90 percent of the cholesterol in butter fat, is located primarily in the milk fat globule membrane.

Milk fat is known to comprise a plurality of globules, each surrounded by a milk fat globule membrane. Dapper et al., "Use of Polar Aprotic Solvents to Release Membranes from Milk Lipid Globules," J. Dairy Sci. 70:760 (1987) disclose that aqueous solutions of selected polar aprotic solvents release milk fat globule membranes from milk fat globules. The properties of these chemically-released milk fat globule membranes were compared to the properties of milk fat globules released by churning and by successive freeze/thaw cycles. However, there was no suggestion about removal of cholesterol from the milk fat globule membranes.

Keenan et al., "Biochemical and Morphological Comparison of Plasma Membrane and Milk Fat Globule Membrane from Bovine Mammary Gland," J. Cell. Bio. 44:80 (1970) used solvent systems to obtain chromatographic separation of milk fat membrane lipids after separation of the membranes from the remainder of the milk fat. However, neither disclosure suggests selective extraction of cholesterol from substantially intact milk fat globule membranes.

Shishikura, "Modifications of Butter Oil by Extraction with Supercritical Carbon Dioxide", Agric. Biol. Chem. 50:1209 (1986), notes that supercritical fluid extraction using carbon dioxide is useful for fractionation of triglycerides in butter oil according to carbon number, but that this technique does not separate cholesterol from the triglycerides. Instead, butter oil was contacted with supercritical carbon dioxide and silicic acid. However, this supercritical technique not only lowered the cholesterol level, but also affected the triglyceride distribution. Thus, the technique is unsatisfactory, because the composition and spreadability are affected.

SUMMARY OF THE INVENTION

It is an object to this invention to provide a process for the reduction of the cholesterol content of milk fat by solvent extraction.

It is another object of this invention to provide a process for the reduction of cholesterol content in milk fat by solvent extraction of cholesterol from milk fat globule membranes while the membranes are substantially intact.

It is a further object of this invention to provide a process for the reduction of the cholesterol content of milk fat by solvent extraction without significantly altering the character of the milk fat and substantially without removing fat.

It is yet another object of this invention to provide low-cholesterol milk fat products produced in accordance with these processes.

In accordance with these and other objects, this invention relates to a process for the production of low-cholesterol milk fat wherein milk is separated into at least one aqueous fraction and a cream fraction. The cream fraction is washed and reseparated a plurality of times to provide a washed cream fraction containing substantially undisturbed milk fat globule cores and substantially intact milk fat globule membranes. Cholesterol is preferentially extracted at reduced temperature from the milk fat globule membranes with an organic polar solvent and without substantial loss of the solid milk fat. Solvent-free, low-cholesterol milk fat product is recovered from the reseparated, washed cream fraction. This low-cholesterol milk fat product has composition and organoleptic characteristics substantially similar to those of natural milk fat. The invention also relates to a low-cholesterol milk fat product having composition and organoleptic characteristics substantially similar to those of natural milk fat and produced by the method of this invention.

DETAILED DESCRIPTION OF THE INVENTION

The present invention is based on the discovery that cholesterol can be removed from milk fat by solvent extraction wherein a polar solvent is utilized to preferentially extract cholesterol from substantially intact milk fat globule membranes without substantial loss of milk fat. This method is advantageously utilized to produce low-cholesterol milk fat products having the characteristics and organoleptic properties of natural milk fat.

A major portion of the cholesterol in milk fat is concentrated in the milk fat globule membrane. This invention is based on the discovery that cholesterol advantageously can be removed by solvent extraction from relatively undisturbed milk fat globule membranes substantially without affecting the characteristics and organoleptic properties of the fat when the temperature is sufficiently low that the milk fat globule cores are essentially solidified. Also, at this temperature, the solubility of fat in solvent is relatively low. Thus, at reduced temperature, cholesterol is extracted from milk fat globule membranes but the milk fat globule cores are substantially unaffected.

Skilled practitioners recognize that globules may become aggregated, agglomerated, or disrupted during handling unless globule-containing fluids are handled in a manner which precludes these phenomena. Also, free fat exudes from disrupted globules and globules from which the membrane has been at least partially removed. Membrane fractions may become re-associated with and at least partially surround free fat and denuded cores.

Globules become disrupted, agglomerated, or aggregated under condition which subject the fluid to stress, such as high shear rates during pumping, thermal shock, and high force during separation, e.g., centrifugation at very high multiples of the force of gravity. Therefore, in the practice of the method of the invention, such conditions should be avoided. Although the inventors do not wish to be bound by this theory, it is believed that aggregation or agglomeration of particles precludes contact between solvent and membrane, thus reducing the efficiency of extraction of cholesterol when practicing the method of the invention. Mechanical disruption also may reduce extraction efficiency, and increase fat loss during subsequent processing. Although the inventors do not wish to be bound by this theory, it is believed that mechanical disruption affects both the membrane and the globule core in a manner which makes cholesterol less available to extraction from the membrane. Throughout the specification and claims, the words "undisturbed" and "intact," when used to describe milk fat globule membranes, means membranes which are able to be contacted by solvent so that cholesterol can be extracted from the membranes. Thus, membranes which surround milk fat globules which aren't substantially agglomerated or aggregated, without regard to whether the membrane was originally associated with or becomes re-associated with a milk fat globule core, and which are not mechanically disrupted, are considered "undisturbed" or "intact" membranes for the purpose of this invention.

Milk fat globules with the milk fat globule membranes substantially undisturbed are obtained from milk by separating milk into at least one aqueous fraction and a cream fraction. The cream fraction then is treated by alternately washing with water and separating a plurality of times to provide a washed cream fraction in which the milk fat globule cores and milk fat globule membranes are substantially intact. Thus, in addition to non-fat components, the cream fraction comprises essentially intact membranes associated with milk fat globule cores and dissociated milk fat globule membranes.

In accordance with the method of the invention, a polar solvent is used to remove cholesterol from milk fat without substantially affecting the fat composition and organoleptic properties of the reduced-cholesterol product. The solvent preferentially removes cholesterol from the milk fat globule membranes substantially without affecting the solidified fat in the milk fat globule cores. The solvent extracts cholesterol from the membranes, and preferably dissolves only a minute quantity of fat.

Alternate freeze/thaw cycles may be utilized before solvent extraction to make milk fat globule membranes more susceptible to extractive action of the solvent substantially without affecting the integrity of the milk fat globule core. Such pre-treatment also causes a fraction (up to about 15 percent) of the milk fat globule membranes to become detached from globule cores. Detached membranes may be washed out of the cream fraction during subsequent steps of the method of the invention. This removal of membranes affords a concomitant reduction of the cholesterol content of the ultimate reduced-cholesterol product.

In the practice of this invention, typically at least about 50 percent of the cholesterol is extracted. It is preferred to remove at least about 60 percent, more preferably at least about 70 percent, of the cholesterol originally present. However, any removal level can be selected by those who practice the invention. Cholesterol reduction in excess of 85 percent has been achieved by the practice of this invention.

It is preferred to treat milk fat globules with as few changes as possible after production by the animal. Milk fat suitable for use in this invention includes any milk fat in which cholesterol is concentrated primarily in the milk fat globule membranes, the milk fat globules are substantially undisturbed, and the milk fat globule membranes are substantially intact. Therefore, the milk fat globules should not be excessively agitated or exposed to conditions which will produces agglomerated or aggregated milk fat globules which, for reasons described above, reduce the effectiveness of subsequent solvent extraction. Although the invention is exemplified with bovine milk fat, and such milk fat is probably most important commercially, the invention encompasses any milk fat having a major portion of any cholesterol present contained within the milk fat globule membranes.

Suitable milk fat can be of any age, but preferably is less than about three days old, more preferably less than about one day old, and most preferably is less than about eight hours old. It has been discovered that the method of the invention is most effective with fresh milk fat. Although the inventors do not wish to be bound by this theory, it is believed that cholesterol migrates from the milk fat globule membrane into the milk fat globule core as the milk fat globule ages, and some cholesterol is esterified. Therefore, to maximize the effectiveness of the method of this invention, it is preferred to use newly-formed milk fat globules. Further, the milk should be gently handled and, whenever possible, stresses such as pump shear and thermal shock should be avoided to minimize the production of aggregated or agglomerated milk fat globules, which make solvent extraction of the cholesterol less effective.

Skilled practitioners recognize that the efficiency of separation of a cream phase from an aqueous phase, such as the plasma phase or aqueous media used in subsequent washes, is maximized at relatively warm temperatures, i.e., about 40° C. Separation of cold (5°-10° C.) aqueous and cream phases is relatively more difficult than separation at a higher temperature primarily because the viscosity of the fluid is higher and the difference in densities of the phases is smaller. Other factors, such as decreased particle size of the milk fat globules, also contribute to the greater difficulty of achieving good separation at lower temperature. At higher temperature, release of membranes from milk fat globules is accentuated, but milk fat globule cores are more fluid and therefore subject to degradation into smaller, more difficultly separated particles. Thus, the preferred temperature range is between about 25° and 40° C.

Typically, centrifugation in accordance with the method of the invention is carried out at a force in the range of up to about 10,000 gravities. Skilled practitioners recognize that centrifugal separation typically is carried out at forces of more than about 5000 to about 10,000 gravities, but these higher forces disrupt milk fat globules. As described above, this phenomenon reduces efficiency of solvent extraction, and is to be essentially avoided. Lower centrifugation forces yield less fat because the separation of the cream fraction from the aqueous fraction is not as good, with some fat being lost to the aqueous fraction. However, disruption is reduced. Therefore, typically, centrifugation typically is carried out at a force in the range of up to about 10,000 gravities, preferably between about 1000 and 5000 gravities. Those skilled in the art will, with the guidance provided herein, be able to select the appropriate force and temperature at which to make this separation.

Milk is separated into at least one aqueous fraction and a cream fraction. Those skilled in the art are familiar with this operation, which typically is performed by centrifugation. In keeping with the preference that milk be handled gently, it is preferred that stresses such as thermal shock, pump stress, and abuse during centrifugation be minimized. The precise fat concentration in this cream fraction can be selected by those skilled in the art, and is dependent, inter alia, upon demand for products derived from the aqueous portion and the economic factors regarding subsequent processing. Therefore, the precise fat concentration of this cream fraction is not critical.

The cream fraction then is washed with warm water, i.e., water at a temperature between about 15° and 60° C., preferably between about 25° and 55° C., and more preferably between 35° and 50° C. The purpose of this wash is to remove the aqueous fraction of the milk, to strip away proteins which are associated with the surface of the milk fat globule membrane, and to remove milk fat globule membranes which have become dissociated from milk fat globule cores. Removal of these dissociated milk fat globule membranes produces a reduction in cholesterol content proportional to the fraction removed, as described above. Typically, the cream fraction is washed with a volume of water between about 50 to 175 percent, more preferably between about 65 and 150 percent, and most preferably between about 80 and 125 percent, of the volume of the cream fraction.

The washed cream is separated into at least one aqueous fraction and a washed cream fraction, typically by centrifugation. The severity of the centrifugation should be sufficient to make the separation, yet insufficient to degrade the milk fat globules, as described above.

After centrifugation, the washed cream fraction preferably is again washed and subsequently centrifuged. Typically, between 1 and 5, preferably between 2 and 4, wash/centrifuge cycles are utilized. An excessive number of wash/centrifuge cycles would unnecessarily expose the milk fat globules to disruptive influences, and later cycles provide disproportionately little benefit. Too few cycles may fail to remove a sufficient amount of the protein adhered to or associated with the membranes.

The fat concentration of the washed cream from the final centrifugation is established by economic, product identity and use, and product handling considerations. Water remaining in the washed cream fraction dilutes the polar solvent used to extract cholesterol, thus reducing the amount of cholesterol extracted per unit of solvent. The presence of an excessive quantity of water also increases the cost of recovering solvent, as more water must be removed from spent solvent before the regenerated solvent is suitable for re-use. Therefore, the water concentration of the washed cream should be minimized. However, a very high fat concentration in the washed cream makes it difficult to transport the washed cream and to prevent mechanical disruption of milk fat globules. Thus, although washed cream having any fat concentration can be treated in accordance with the method of this invention, the fat concentration of the washed cream preferably is between about 20 and 60 weight percent, more preferably is between 30 and 55 weight percent, and most preferably is between about 40 and 50 weight percent.

It has been discovered that cholesterol is extracted from milk fat globule membranes essentially without affecting the fat composition or organoleptic properties of the fat. However, the temperature at which extraction is carried out affects both the fat loss to the solvent and the efficacy of the solvent. For example, extraction at low temperature decreases fat loss, but also reduces solvent efficacy. Conversely, extraction at higher temperature increases solvent efficacy, but also increases fat loss.

Washed cream typically is cooled to a temperature of less than about 30° C., preferably less than about 10° C., more preferably between 0° and 8° C., and most preferably between 2° and 6° C. It has also been discovered that subjecting the washed cream to freeze/thaw cycles before solvent extraction enhance the effectiveness of the subsequent extraction. Thus, after, or as part of, the cooling process, the washed cream may be alternately frozen and thawed before solvent extraction. As described above, alternate freezing and thawing action completely separates a fraction of milk fat globule membranes from the globule cores. Some of the membranes are removed during subsequent washing steps. Further, a number of those membranes which remain associated with a milk fat globule core are disrupted by the treatment, facilitating extraction of cholesterol. Between about 1 and 4 freeze/thaw cycles, wherein the temperature of the mass is lowered to about $-20°$ C., then raised to about 4° C., are utilized. Typically, two cycles are sufficient. Alternate freeze/thaw cycles also may remove additional water from the washed cream. This water preferably is separated from the fat by gentle centrifugation, as described above.

Cooled washed cream which has been treated as described above is dispersed quickly into a quantity of polar solvent. The temperature of the solvent should be established as low as possible to help ensure that the milk fat globule cores remain undissolved while cholesterol in the milk fat globule membranes is being extracted. Thus, the solvent temperature should approximately equal or be lower than the temperature of the cooled washed cream.

The volume of solvent into which the cooled washed cream is dispersed preferably is between about 1 and 30, more preferably between about 2 and 20, and most preferably between 3 and 10 times the volume of the cooled washed cream. A plurality of extraction steps may be utilized. The precise volume of solvent and number of repeated treatments are established to obtain the degree of cholesterol removal desired without exceeding the fat loss which can be tolerated. Large volumes of solvent and repeated extractions increase cholesterol removal at the expense of fat yield. For example, treatment comprising three extractions using 10 volumes of extractant per volume of cream produces about 80–90 percent cholesterol reduction with at least about 90 percent fat recovery, while a single extraction using only 3 volumes of extractant per volume of cream produced only 35–80 percent cholesterol reduction, but at least about 95 percent of the fat is recovered.

Washed cream is dispersed into the solvent rapidly and is mixed into the solvent gently. Those skilled in the art can, with the guidance provided herein, establish conditions which ensure adequate mixing and agitation yet do not cause deleterious aggregation or agglomeration of milk fat globules.

A reduced-cholesterol milk fat fraction is separated from cholesterol-laden solvent fraction by any method. In particular, vacuum filtration conveniently is used to make the separation. Alternatively, a centrifuge can be used to achieve separation. After the desired number of solvent treatments, residual solvent can be removed from the treated fat by a subsequent water wash if the solvent is water miscible. Alternatively, the milk fat can be melted and vacuum distilled under mild conditions ($-28$ in. Hg vacuum at 90° C.) to ensure complete removal of the solvent from the reduced-cholesterol milk fat.

If additional deodorization is desired, the milk fat can be vacuum steam stripped up to 150° C. for $\frac{1}{2}$ hour at 2-6 mm Hg vacuum. A steam rate of 5 percent of the weight of the fat per hour is utilized. Other techniques known to skilled practitioners can be utilized to provide deodorized, reduced-cholesterol product.

Cholesterol-laden solvent separated from reduced-cholesterol milk fat can be treated to remove cholesterol, fats, water, and water-soluble components, and thus—treated solvent can be used in the method of the invention. Any method of solvent recovery can be utilized; solvent recovery forms no part of this invention.

Solvents suitable for use in the method of this invention include organic polar solvents having sufficient polarity to extract cholesterol, yet are not so polar that they cannot be separated from the milk fat without utilizing conditions which will have a deleterious effect on the fat or they extract an unacceptable of fat with the cholesterol. The solvent should also be selected so that a light vacuum deodorization step, as known to those skilled in the art and described above, is sufficient to remove residual solvent. Preferably, food grade solvent is utilized to eliminate the need to treat the product to remove contaminants which may have been introduced by the solvent.

Strength of a solvent is quantified by the dipole moment, or polarity. The selection of a solvent is of course, an economic decision based, inter alia, upon the cost and availability of food grade solvents, the degree of cholesterol removal required, and the amount of fat loss which can be tolerated. With the guidance provided herein, one skilled in the art can select solvents suitably utilized in the method of the invention.

A solvent which is not polar has dipole moment of 0 debye (D). A relatively polar solvent such as dimethylsulfoxide has a dipole moment of 3.9 D. Dipole moments of various organic solvents are summarized in Lange's Handbook of Chemistry at pages 10-103 to 10-116 (12th Ed.), incorporated herein by reference. A skilled practitioner recognizes that some of these solvents may not be suitable for use in contact with foodstuffs, and can select those solvents which provides the desired characteristics. Typically, suitable solvents have a dipole moment of at least about 0.5 D, preferably between about 1.0 and 4.0 D, and more preferably between about 1.5 and 3.0 D. For example, acetone (2.88 D) and ethanol (1.69 D) are more preferred solvents. At equivalent conditions, use of acetone will result in higher fat loss than use of ethanol, however.

The same solvent need not be used in each of a plurality of extraction steps. Rather, the solvent used in each such step preferably is selected to provide particular characteristics. For example, it is preferred that water be sufficiently soluble in the solvent into which the washed cream is first introduced so that the aqueous phase is essentially completely removed from the washed cream to yield an essentially anhydrous milk fat fraction upon separation. More preferably, water is miscible in this solvent. The lower alkanols and acetone are more preferred solvents in which water is miscible. For subsequent extractions, the solubility of water in the solvent typically is less important if the first solvent has essentially completely removed the aqueous phase from the milk fat.

The purity of the solvent is matter economic choice. For example, anhydrous ethanol need not be utilized. Ethanol having as much as 10 weight percent water is suitable for use in the practice of the method of this invention. However, low extractant purity impairs the ability of the extractant to function efficiently. Therefore, it is preferred to use absolute, or anhydrous, solvent for the first solvent treatment, then utilize less-pure solvent in subsequent extraction stages, to minimize fat loss.

Adjuvants may be incorporated into the butterfat as is known to those skilled in the art. Typical additives include anti-oxidants such as TBHQ and BHA, fat-soluble vitamins such as Vitamins A, D, E, and K, colorants, and stabilizing agents such as citric acid.

Low cholesterol milk fat product of the invention is suitably used as a substitute for butter fat in a variety of products, such as butter, ice cream, sour cream, soups, puddings, cream fillings, and the like.

The following examples illustrate various aspects of this invention, but are in no way intended to limit the scope of the invention. The scope of the invention is limited only by the appended claims.

EXAMPLES

In Examples 1-6, washed cream having a fat content of 30 percent and prepared in accordance with the method of the invention was utilized.

EXAMPLE 1

Two hundred fifty grams of washed cream was gently dispersed into 750 ml absolute ethanol at 4° C., in accordance with the method of the invention. The mixing was accomplished with a kitchen-type blender on low speed for 30 seconds. The solution was quickly vacuum filtered. The recovered fat had a cholesterol concentration one-half of that of untreated milk fat.

EXAMPLE 2

Washed cream was subjected to 3 freeze/thaw cycles. Excess water was removed from the treated cream by centrifugation at 4°-10° C. The cream concentrate was dispersed into an equal volume of absolute ethanol. The solvent was removed by filtration. A 65 percent cholesterol reduction was achieved in the low cholesterol milk fat product.

EXAMPLE 3

Washed cream was subjected to 3 freeze/thaw cycles. The cold cream was thoroughly dispersed by hand with a whip into 4° C. absolute ethanol and quickly filtered in accordance with the method of the invention. A 55 percent cholesterol reduction was obtained.

A comparison of Example 2 with Example 3 illustrates that cholesterol reduction was increased by reducing the water content of the washed cream.

EXAMPLE 4

Washed cream was mixed with 4 volumes of 90 percent ethanol at room temperature (26° C.) in accordance with the method of the invention. The solution was stored over night at 3°-6° C. After separation, the recovered alcohol contained 3 percent of the butter fat while a 52 percent cholesterol reduction was achieved in the milk fat.

EXAMPLE 5

Washed cream was gently mixed into 4 volumes of 90 percent ethanol at 26° C. After a short period, the solvent was separated from the fat faction. The solvent contained 6 percent of the fat and 65 percent of the cholesterol.

Examples 4 and 5 illustrate the effect of extraction temperature on cholesterol reduction and fat loss.

EXAMPLE 6

Washed cream was mixed at low speed in a blender with 3 volumes of 90 percent ethanol at 5° C. The alcohol was filtered off and the process repeated twice, in accordance with the method of the invention. The resulting low cholesterol milk fat product had a 63 percent cholesterol reduction while 3.7 percent of the fat was lost to the solvent.

In Examples 7-10, washed cream having 50 percent fat prepared in accordance with the method of the invention was utilized.

EXAMPLE 7

Cholesterol was extracted from the washed cream by blending the cream gently on low speed in a blender with 8 volumes of 95 percent ethanol. The method yielded a 70 percent cholesterol reduction in the milk fat.

EXAMPLE 8

Washed cream was mixed gently mixed at low speed in a blender with an equal volume of acetone at 5° C., filtered, and twice mixed with an equal volume of 95 percent ethanol. Only 25 percent of the cholesterol remained in the separately-recovered low cholesterol milk fat product.

EXAMPLE 9

Washed cream was gently mixed with 2 volumes of acetone at room temperature by blending on low speed in a blender until thoroughly mixed, filtered, and again mixed with 2 volumes of acetone. The method of the invention produced a 70 percent cholesterol reduction. Twelve percent of the fat was lost to the solvent.

EXAMPLE 10

Washed cream was gently mixed in a blender on low speed with 8 volumes of 95 percent ethanol at room temperature. Solvent and fat were separated by filtration. A 74 percent cholesterol removal was obtained in the low cholesterol milk fat product.

Examples 10 and 11 illustrate usefulness of low cholesterol milk fat product made in accordance with the method of the invention. In each, low cholesterol milk fat product was produced by alcohol extraction in accordance with the method of the invention. The resulting product was vacuum treated to ensure that all alcohol was removed.

EXAMPLE 11

Vacuum treated product was blended with skim milk, diary flavors, and other adjuvants, then homogenized into a heavy cream and churned into a low cholesterol butter product. This product had one-half the cholesterol of untreated butter.

The low cholesterol product was substituted for an equal weight of butter into a cream soup recipe. A 23 percent reduction in cholesterol was achieved in the soup product. Each product was evaluated by a flavor evaluation panel. No significant differences in organoleptic characteristics were identified.

EXAMPLE 12

The butteroil described above was blended with skim milk and dairy flavorings, followed by homogenation to produce a low-cholesterol cream product having 20 percent fat. The product was used in place of milk in a vanilla pudding mix prepared according to package directions. The result was a low cholesterol, rich vanilla cream product suitable for preparing products such as eclairs. There was no significant organoleptic difference between this product and one made with an equal quantity of cream.

Although preferred embodiments of this invention have been discussed herein, those skilled in the art will appreciate that changes and modifications may be made without departing from the spirit of the invention, as described in and limited only by the scope of the appended claims.

We claim:

1. A method for producing low cholesterol milk fat product comprising:
   a. separating milk into at least one aqueous fraction and a cream fraction;
   b. washing said cream fraction with water followed by reseparation a plurality of times to provide a washed cream fraction containing up to about 60 percent fat and substantially intact milk fat globule membranes;
   c. extracting cholesterol from the milk fat globule membranes in the washed cream fraction with an organic polar solvent without substantial loss of the solid milk fat; and
   d. recovering a solvent-free low cholesterol milk fat product from the extracted, washed cream fraction, said low cholesterol milk fat product having composition and organoleptic characteristics substantially similar to those of natural milk fat.

2. The method of claim 1 further comprising alternately freezing and thawing the cream fraction or the washed cream fraction of step (b) to make the membranes more susceptible to extractive action during subsequent extraction and to cause a portion of the membranes to become detached from the globule cores.

3. The method of claim 1 wherein the extraction of step (c) comprises (i) dispersing the cooled washed cream fraction of step (b) into a volume of solvent in which water is sufficiently soluble to produce an essentially anhydrous milk fat fraction and water-laden solvent, said volume between about 1 and 30 times the volume of the cooled washed cream fraction, said solvent having a temperature equal to or less than the temperature of the washed cream, and separating the essentially anhydrous milk fat fraction from the water-laden solvent, and (ii) dispersing said anhydrous milk fat fraction into a quantity of solvent having a temperature equal to or less than the temperature of said anhydrous milk fat fraction followed by reseparation at least once, said solvent quantity between about 1 and 30 times the volume of the milk fat fraction.

4. The method of claim 3 further comprising cooling the washed cream of step (b) to a temperature of less than about 30° C.

5. The method of claim 4 wherein the washed cream of step (b) is cooled to a temperature of less than about 10° C.

6. The method of claim 5 wherein the washed cream of step (b) is cooled to a temperature between about 0° and 8° C.

7. The method of claim 6 wherein the washed cream of step (b) is cooled to a temperature between about 2° and 6° C.

8. The method of claim 3 wherein the separation of step (a) is carried out at a temperature between about 25° and 40° C.

9. The method of claim 3 wherein each wash water of step (b) is at a temperature between about 15° and 55° C.

10. The method of claim 9 wherein the volume of wash water utilized in each wash of step (b) is between about 50 and 175 percent of the volume of the cream fraction.

11. The method of claim 9 wherein up to about 5 washings of step (b) are utilized.

12. The method of claim 3 wherein each solvent has a dipole moment between about 1.0 and 4.0 D.

13. A method for producing low cholesterol milk fat product comprising:
   a. separating milk into at least one aqueous fraction and a cream fraction at a temperature less than 40° C.;
   b. washing said cream fraction with water at a temperature between about 15° and 60° C.. followed by reseparation a plurality of times to provide a washed cream fraction containing between about 20 and 60 percent fat and substantially intact milk fat globule membranes;
   c. cooling the washed cream fraction to a temperature less than about 30° C. and
      (i) dispersing the cooled washed cream fraction into an organic polar solvent in which water is sufficiently soluble to produce an essentially anhydrous milk fat fraction and water-laden solvent and having a temperature equal to or less than the temperature of the cooled washed cream fraction;
      (ii) separating the anhydrous milk fat fraction from the water-laden solvent; and
      (iii) dispersing the anhydrous milk fat fraction into an organic polar solvent followed by reseparation at least once to extract cholesterol from the milk fat globule membranes in the washed cream fraction; and
   d. recovering a solvent-free low cholesterol milk fat product from the extracted, washed cream fraction, said low cholesterol milk fat product having composition and organoleptic characteristics substantially similar to those of natural milk fat.

14. The method of claim 13 further comprising alternately freezing and thawing the cream fraction or the washed cream fraction of step (b) to make the membranes more susceptible to extractive action during subsequent extraction and to cause a portion of the membranes to become detached from the globule cores.

15. The method of claim 13 wherein the washed cream fraction is cooled to a temperature of less than 10° C.

16. The method of claim 15 wherein the washed cream fraction is cooled to a temperature between about 2° and 6° C.

17. The method of claim 15 wherein each solvent has a dipole moment between about 1.0 and 4.0 D.

* * * * *